March 3, 1970   H. M. HERBENER   3,498,298
GIRDLE WITH MOVABLE STAY THE ABDOMINAL REGION
Filed Dec. 20, 1967   7 Sheets-Sheet 1
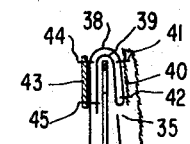
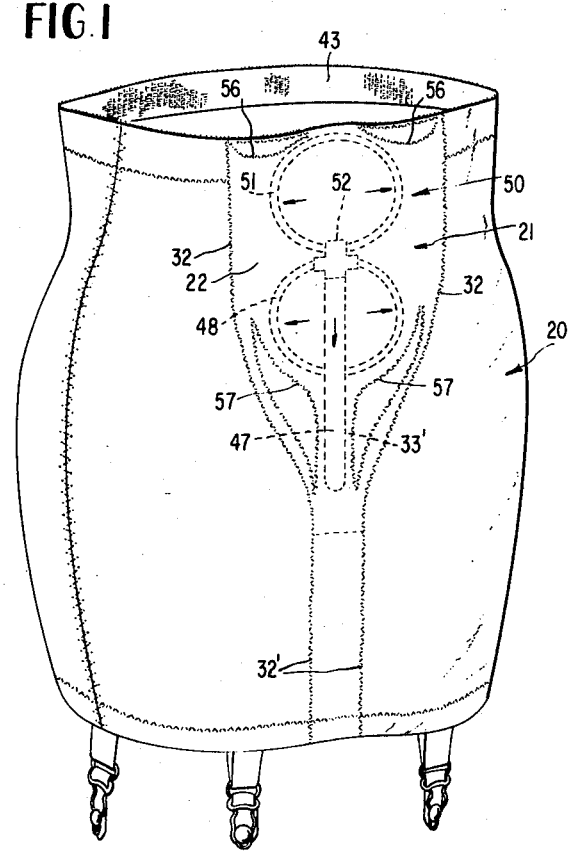
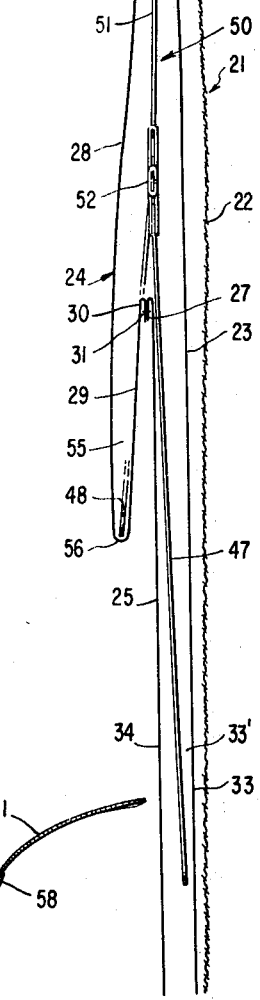
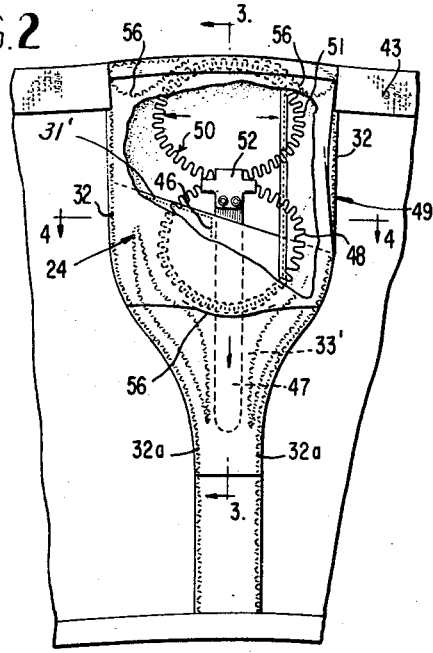
INVENTOR
HENRY M. HERBENER
BY
ATTORNEY

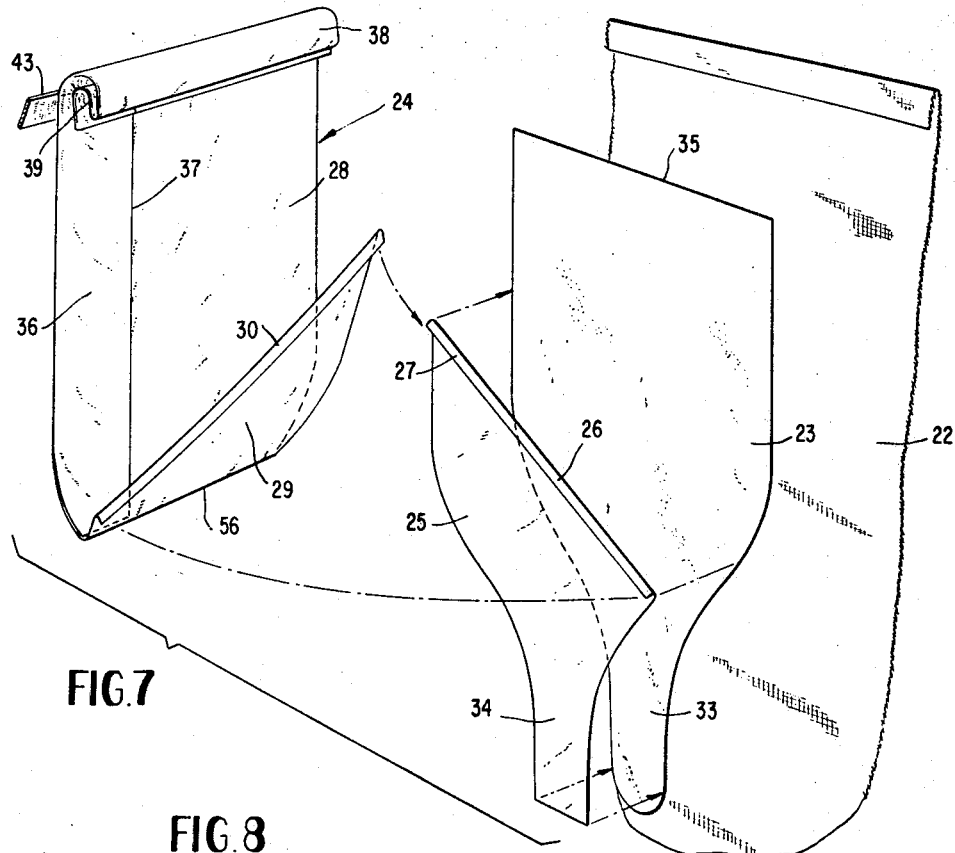
FIG. 7
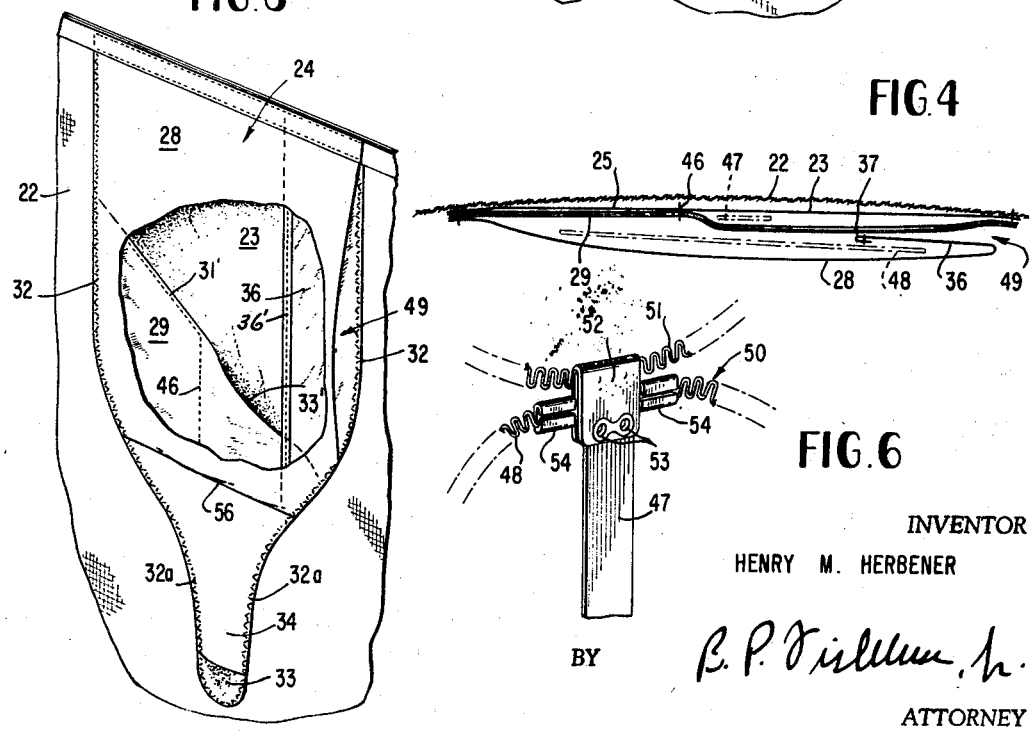
INVENTOR
HENRY M. HERBENER
BY
ATTORNEY

March 3, 1970  H. M. HERBENER  3,498,298
GIRDLE WITH MOVABLE STAY THE ABDOMINAL REGION
Filed Dec. 20, 1967  7 Sheets-Sheet 3

INVENTOR
HENRY M. HERBENER

BY

ATTORNEY

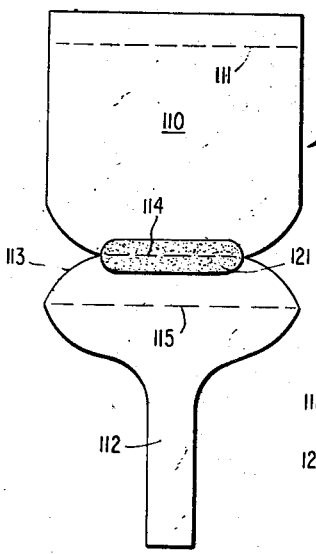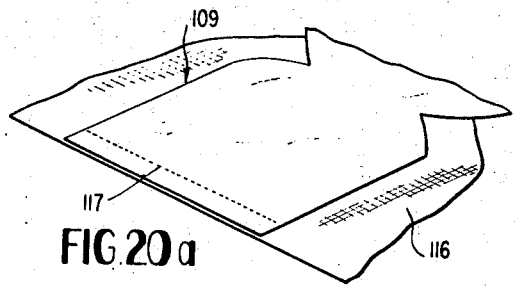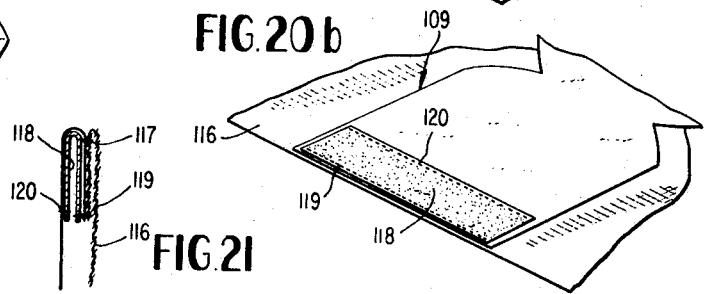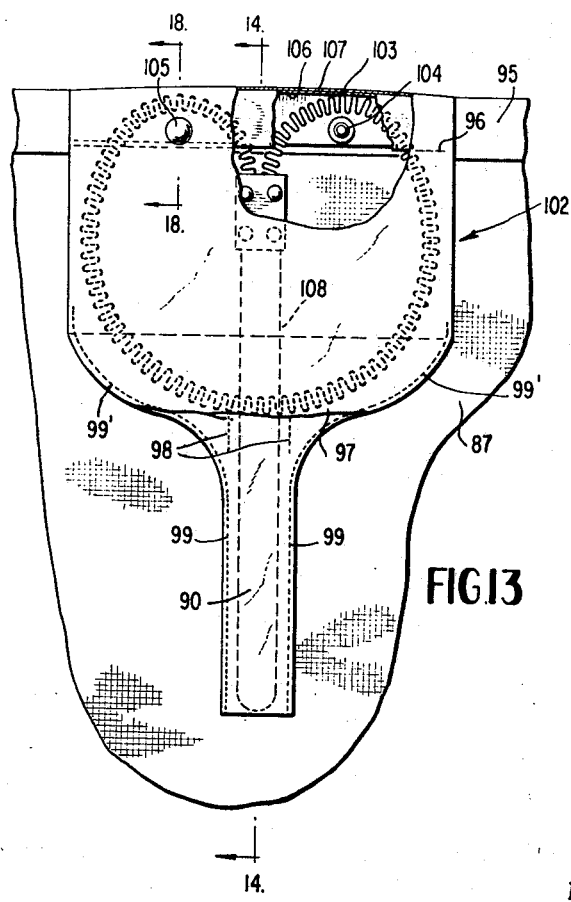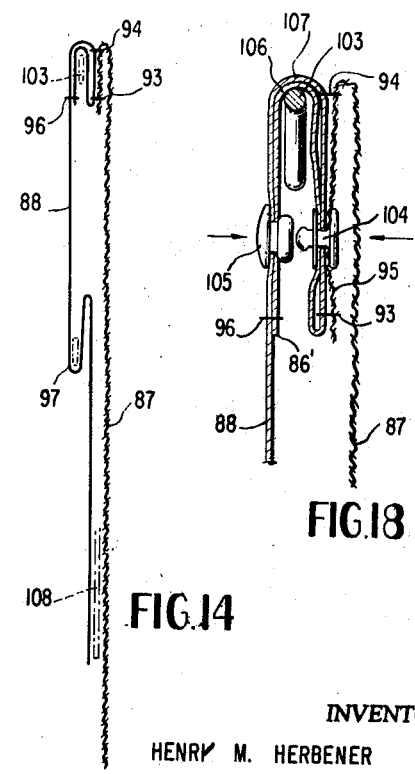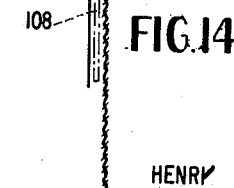

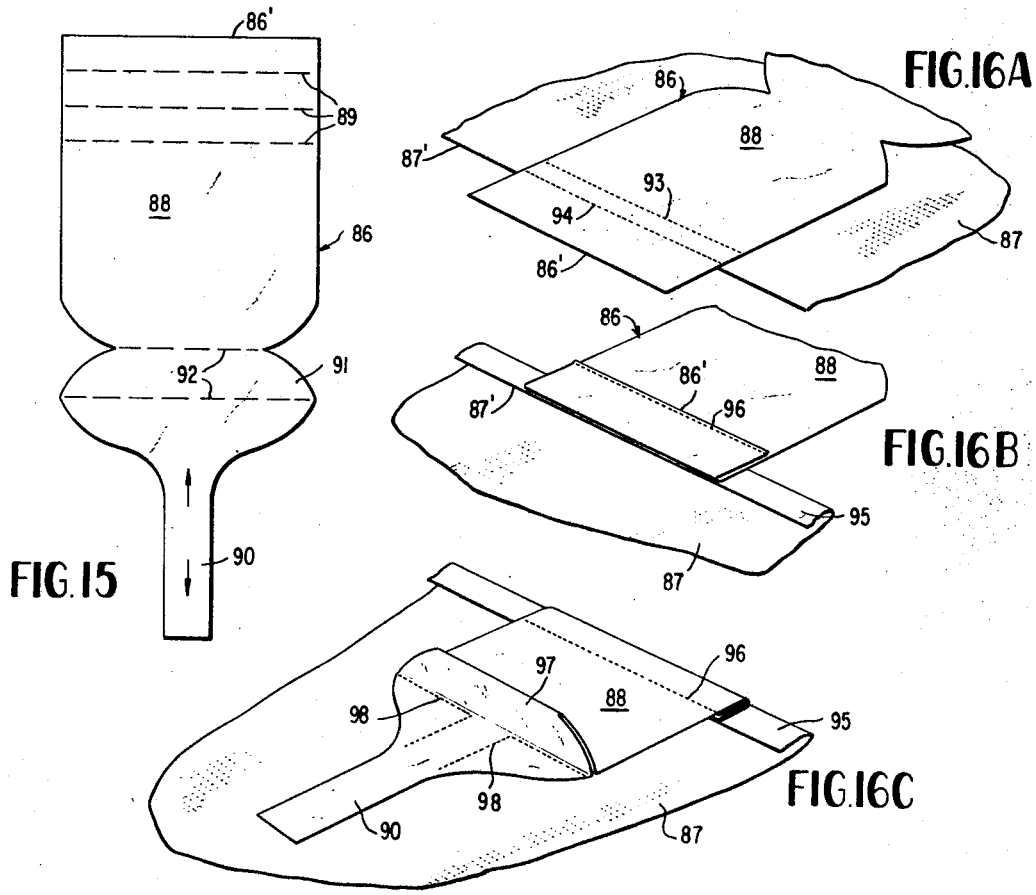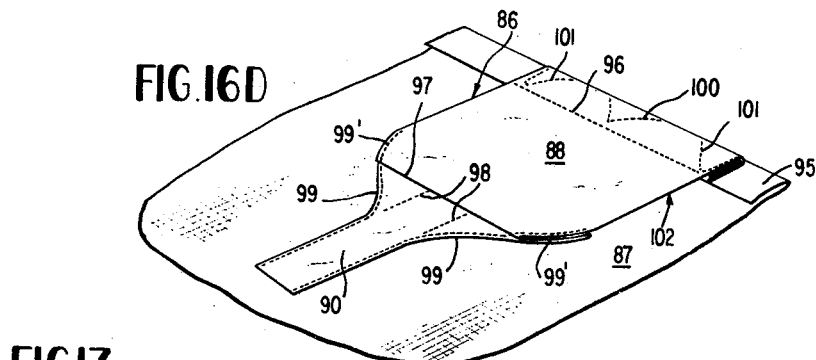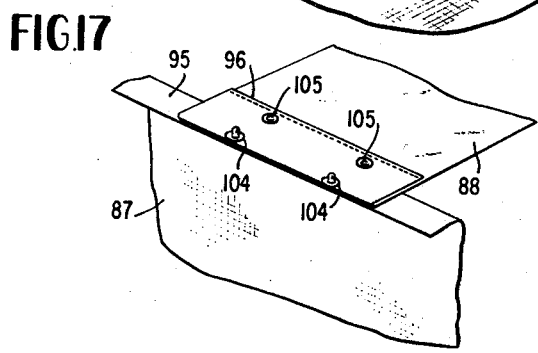

March 3, 1970     H. M. HERBENER     3,498,298
GIRDLE WITH MOVABLE STAY THE ABDOMINAL REGION
Filed Dec. 20, 1967     7 Sheets-Sheet 6
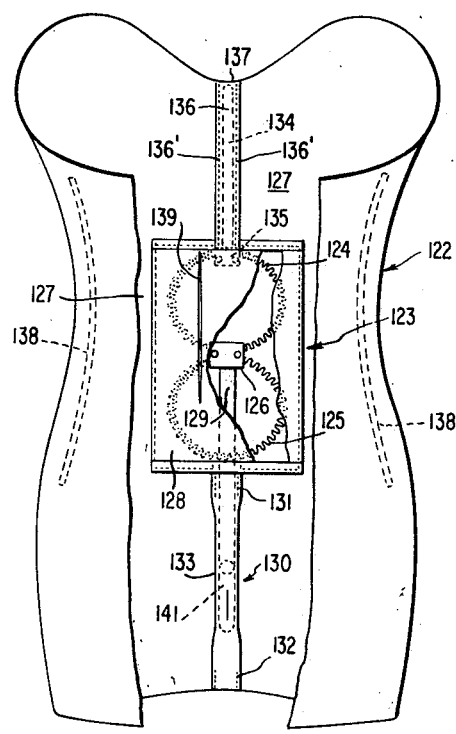
FIG. 22
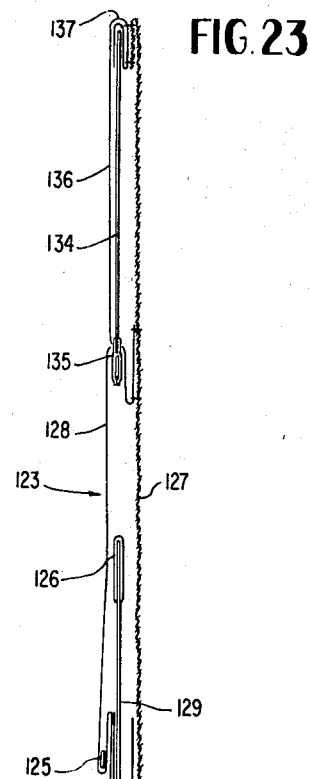
FIG. 23
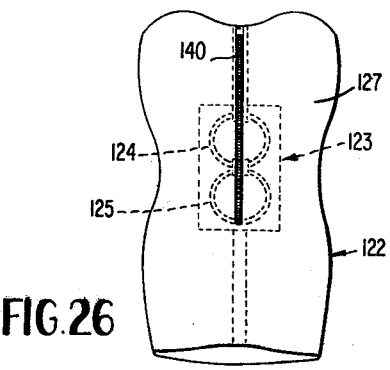
FIG. 25
FIG. 26
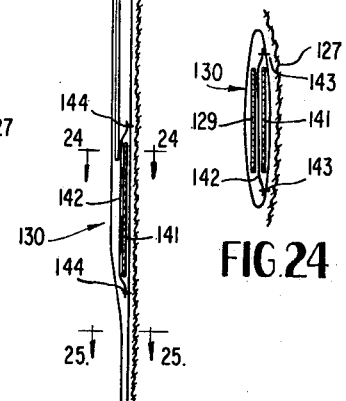
FIG. 24
INVENTOR
HENRY M. HERBENER
BY *B. P. Fishburn, Jr.*
ATTORNEY

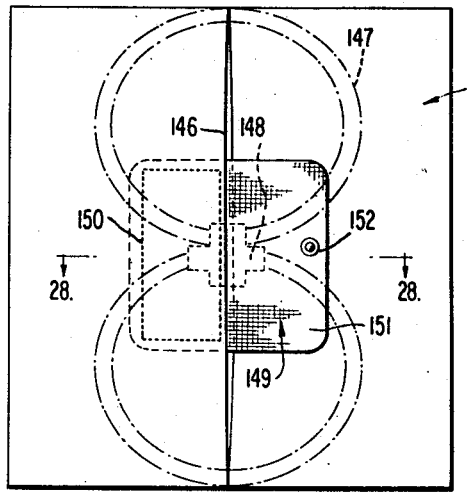
FIG. 27
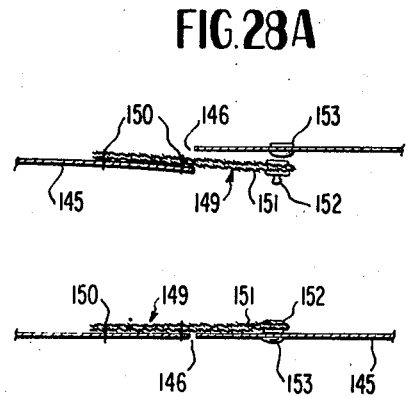
FIG. 28A
FIG. 28B
FIG. 29
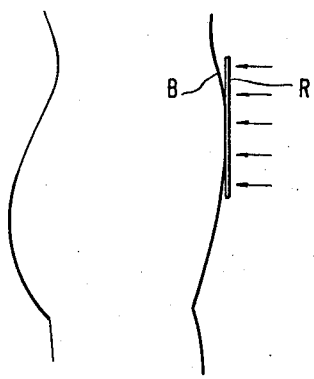
FIG. 30

United States Patent Office 3,498,298
Patented Mar. 3, 1970

3,498,298
GIRDLE WITH MOVABLE STAY FOR THE ABDOMINAL REGION
Henry M. Herbener, 803 N. Dawson St., Thomasville, Ga. 31792
Filed Dec. 20, 1967, Ser. No. 692,139
Int. Cl. A41c *5/00, 1/08*
U.S. Cl. 128—533         28 Claims

ABSTRACT OF THE DISCLOSURE

A girdle having a front abdominal control panel or portion comprised of a pocket structure and an abdominal control insert removably mounted in the pocket structure and characterized by the fact that the main rib or stay of the controlling insert has complete freedom of movement in the longitudinal direction during bending movements by the wearer.

BACKGROUND OF THE INVENTION

There has long been a need for a girdle which will provide maximum body control and particularly abdominal control without sacrificing comfort. Ideally, the abdominal control portion of the girdle should maintain the abdomen flat and allow abrupt bending by the wearer with complete comfort and without the danger of jabbing a stiffening member or control member into the body. Additionally, the front panel of the girdle should resist rolling and sagging at the front of the waist in all use positions. All of the above characteristics should be achieved with a minimum of bulk and without interfering with the ready launderability of the garment or detracting from its neat appearance.

The prior art for a long time has endeavored to provide the above desirable features, although without complete success. In instances where adequate control, particularly abdominal control, has been achieved, this has been accomplished with some sacrifice of comfort and freedom of movement. Conversely, where comfort and freedom of movement have been adequate in the prior art, there has been less than adequate control of the body particularly the abdomen.

One example of the prior art in this connection is United States Patent 2,774,073 of Dec. 18, 1956 to Herbener. This patent discloses the use of ribs and resilient wire hoops to control the abdomen and to maintain the top of the girdle elevated while allowing free bending and other movements. While constituting a significant advance in the art, the patented structure still fell short of the ideal outline above. For one thing, in said patent, there was no positive connection between the ribs and tensioning hoops in one disclosed embodiment which renders the combined functioning of these elements impossible in the sense achieved in the present invention. In another disclosed embodiment where a rib is attached to a hoop, the anchorage and pocketing of these elements is such that the required movements of the elements during abrupt bending by the wearer in particular cannot be achieved and there still exists the tendency for the top of the rib to dig into the abdomen, thus producing discomfort and restricting movement.

In the present invention, a unique pocket assembly for the abdominal control insert renders the latter more effective for its intended purpose and allows the necessary relative movements of parts to produce adequate control without restricting movement and sacrificing comfort. Also, the insert is readily removable to facilitate laundering.

SUMMARY OF THE INVENTION

The invention girdle includes a body portion having an abdominal front wall. Inwardly of this front wall is disposed a pocket assembly which may include a pair of pocket walls or a single pocket wall mounted directly to the front wall of the girdle. The pocket assembly receives removably a resilient abdominal control insert consisting of one or more essentially circular spring hoops and a connected vertically extending control rib or stay. The pocket assembly provides a firm bottom support for the hoop or hoops, the top of which serve to elevate and hold up the top edge of the girdle. The pocket assembly includes a narrow vertical guide passage for the rib or stay which allows unrestricted longitudinal movement of the rib or stay during bending movements by the wearer, whereby the rib or stay will never dig into the body. In this manner, abdominal control is achieved without sacrificing of comfort and freedom of movement.

BRIEF DESCRIPTION OF THE DRAWINGS

FIGURE 1 is a front perspective view of a long-waisted girdle embodying one form of the invention;

FIGURE 2 is an interior side elevation of the abdominal control portion of the girdle, partially broken away;

FIGURE 3 is an enlarged fragmentary vertical section taken on line 3—3 of FIGURE 2;

FIGURE 4 is an enlarged horizontal section taken on line 4—4 of FIGURE 2;

FIGURE 5 is a partly diagrammatic view of a control insert;

FIGURE 6 is a fragmentary perspective view of a coupling for a pair of hoops and associated rib;

FIGURE 7 is an exploded perspective view of a pocket assembly;

FIGURE 8 is an assembled perspective view of the same pocket assembly, partly broken away;

FIGURE 13 is another interior side elevation, similar to FIGURE 12, showing a pocket assembly formed essentially by one piece of fabric sewn directly to the girdle front;

FIGURE 14 is a vertical section taken on line 14—14 of FIGURE 13;

FIGURE 15 is a side elevational view of a fabric blank employed to make the one-piece pocket assembly;

FIGURES 16a to 16d are perspective views showing in order the steps of constructing and stitching the one-piece pocket assembly;

FIGURE 17 is a fragmentary perspective view corresponding generally to FIGURE 16b showing how snap fastener elements may optionally be incorporated in the pocket assembly;

FIGURE 18 is an enlarged fragmentary vertical section taken on line 18—18 of FIGURE 13;

FIGURE 19 is a side elevation of a blank, similar to the blank of FIGURE 15, and employed in a further slight modification of the invention;

FIGURES 20a and 20b are perspective views showing the steps of producing a pocket assembly from the blank of FIGURE 19;

FIGURE 21 is a fragmentary vertical section through the top of such pocket assembly made from the blank of FIGURE 19;

FIGURE 22 is an interior elevational view of the front wall portion of a corselet embodying a modification of the invention, with part of the garment rear wall broken away;

FIGURE 23 is an enlarged partly diagrammatic vertical section taken on line 23—23 of FIGURE 22;

FIGURE 24 is a horizontal transverse section taken on line 24—24 of FIGURE 23;

FIGURE 25 is a similar section taken on line 25—25 of FIGURE 23;

FIGURE 26 is a front elevational view on a reduced scale of a corselet embodying another modification;

FIGURE 27 is a partly diagrammatic side elevation showing another modification;

FIGURES 28a and 28b are each horizontal sections taken on line 28—28 of FIGURE 27, with parts shown in different relative positions during use;

FIGURES 29 and 30 are diagrammatic views drawn in an exaggerated manner to illustrate the action of the control rib in flattening the stomach without digging into the body.

DESCRIPTION OF THE PREFERRED EMBODIMENT

Figure 9:
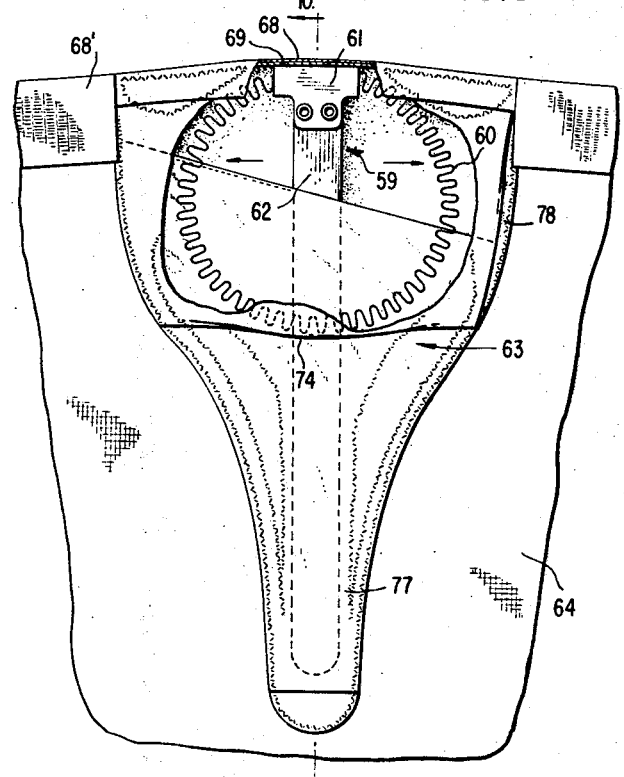
FIGURE 9 is an interior side elevation, similar to FIGURE 2, showing a modification.

Referring to the drawings wherein like numerals designate like parts, a girdle in accordance with one form of the invention is shown particularly in FIGURES 1 through 8, 11 and 11a. The girdle shown in these figures is of the long-waisted type and the actual waistline or bending line of the garment is approximately at the elevation of the coupling element 52, as will be further described.

The girdle comprises a body portion 20 which may be formed partly of non-elastic fabric, one-way stretch or two-way stretch fabric. Generally, although not always, the front abdominal wall of the girdle is non-elastic. If the front wall of the body portion is elastic, this elasticity will be rendered ineffective during use by a non-elastic pocket assembly on the interior side of the front wall, to be described. The body portion 20 may have a back panel which is neither non-elastic or elastic up-and-down only, as is well known. This forms no part of the present invention. The fabric of the body portion may be knitted or woven. The front abdominal panel which embodies the invention herein is shown generally at 21. The remainder of the girdle body portion may be constructed to include many features known to the art to enhance its usefulness and comfort.

The front panel 21 includes an outer wall 22 preferably of non-stretch fabric. Immediately inwardly of the girdle front wall 22 is the outer section 23 of a pocket assembly 24 forming an important feature of the invention. In most cases, the pocket assembly will be formed entirely of sturdy non-stretch fabric such as nylon. In some instances, however, the bottom narrow portion of the pocket assembly may be capable of stretching vertically only while the upper wide pocket portion will be completely non-elastic or at least non-elastic in the up-and-down direction. The pocket assembly 24 is shown in detail in FIGURES 3, 7 and 8.

Immediately inwardly of the forward pocket section 23 is a foreshortened intermediate wall 25 having a diagonal upper edge 26, folded over to form a narrow flange 27. Inwardly of the intermediate wall 25 is an interior pocket wall 28 having an upturned flap 29 at its bottom, said flap lying between the walls 25 and 28 in assembly, FIGURE 3. The upper edge of the flap 29 is folded over at 30 and is cut diagonally parallel with the edge 26. As depicted in FIGURE 3, the elements 27 and 30 are connected by a line of stitching 31 applied at the proper time during the fabrication of the assembly.

In constructing the pocket assembly 24 and integrating the same with the front wall 22 of the girdle, the inside stitching of the pocket is first performed, followed by the attachment of the pocket assembly to the top of the garment with a series of stitching, to be described. That is to say, regarding the interior pocket stitching, the free edge of the flap 36 receives a line of stitching at 36', FIGURE 8, to assure that there is no raw edge on the flap. Next, the flanges 27 and 30 are permanently connected by a line of stitching 31 which extends for the full length of these flanges diagonally of the pocket assembly. As best shown in FIGURE 3, this line of stitching 31 will be concealed from view when the elements 25 and 29 are in their final folded positions in the assembly. Another and shorter line of stitching 31', FIGURE 8, also diagonally of the pocket assembly extends through part of the pocket front wall 23 and corresponding parts of the elements 29 and 25 and terminates near the transverse center of the pocket assembly. This foreshortened line of stitching 31' does not penetrate through the interior pocket wall 28. Similarly, a vertical line of stitching 46, FIGURES 2, 4 and 8, is placed through the walls 23, 25 and 29 but not through the wall 28, and this vertical line of stitching will form an entrance guideway for a rib, to be described, into the narrow pocket formed by the elements 33 and 34.

The interior pocket wall 28 includes at one vertical side thereof the aforementioned integral inwardly folded flap 36 extending for the entire height of the wall 28 and having its edge 37 freely disposed and unstitched to the adjacent pocket walls. The top of the interior wall 28 is folded over at 38 and also folded reversely and rearwardly at 39 to produce a top pocket wall of double thickness adjacent the top edge of the girdle. This is an important feature for resisting wear at the point of maximum wear on the garment.

The girdle front wall 22 is folded inwardly at the top of the garment, FIGURE 3, forming a short flange 40 immediately outwardly of the folded element 38 and stitched only to the element 38 by two lines of stitching 41 and 42. The line of stitching 41 is done first, followed by the line of stitching 42 in the processing of the assembly. At its top edge, the interior of the girdle has a finishing band 43 thereon which preferably extends around the entire top of the girdle and this band is prestitched by a line of stitching 44 to the interior pocket wall 28, FIGURE 3. Another line of stitching 45, which is actually the third stitching operation in applying the pocket assembly to the girdle, connects the lower edge of the band 43 with the interior pocket wall 28 and the rear side of the inner folded layer 39.

The interior stitching of the pocket assembly and the attachment of the top of the pocket assembly to the top of the girdle now being completed as described, it remains only to stitch the sides of the pocket assembly 24 to the girdle front wall 22 and to apply certain ornamental stitching and insert centering stitching, to be described. In this connection, the sides of the pocket assembly are stitched to the girdle front wall 22 by generally vertical zigzag lines of stitching 32, FIGURE 8. These lines of stitching 32 converge downwardly below the full width portion of the pocket assembly and become extension lines of stitching 32a which serve to close the sides of the narrow guide pocket formed by the elements 33 and 34 and to secure these elements to the girdle front wall 22. The bottom end of the narrow guide pocket formed by the elements 33 and 34 remains open for an important purpose, to be described. If desired, the zigzag lines of stitching 32 at the sides of the pocket assembly may terminate at the lower end of the narrow pocket extension, FIGURE 8, or if preferred for appearances sake, the lines of stitching may continue to the lower edge of the girdle as at 32' in FIGURE 1. This is optional.

As clearly shown in FIGURES 4 and 8, one vertical edge of the interior pocket wall 28 carrying the flap 36 is left unattached or unstitched to the wall 23 and garment front wall 22, thus forming a side opening 49 into the pocket assembly, through which the resilient abdominal control insert 50 is introduced into the pocket asembly 24 and removed therefrom. The top edge 35 of pocket wall 23 may also remain unattached or unstitched, as shown in FIGURE 3. The control insert 50 includes the previously-mentioned rib or stay 47, a lower resilient wire hoop 48, an upper companion hoop 51 and a rigid coupling element 52, formed of sheet metal which securely joins the top of the stay 47 with tangential portions of the two hoops. The stay 47 is formed of flat spring steel and the essentially circular hoops 48 and 51 are of the type shown in the Herbener Patent 2,774,073. Each hoop is formed from a section of spring wire formed in a zigzag manner in a single plane to greatly increase the resiliency of the hoop. When relaxed or free of tension, the hoops are circular which is the natural shape for the wire to assume when the ends are drawn together and connected. The connector 52 is riveted at 53 to the top of stay 47 and is clinched over the upper hoop 51. The connector or coupling has side extensions 54 which are clinched over the ends of the lower hoop 48, causing the two hoops to be tangentially arranged at the top of the stay 47 and integrated therewith. In assembly, the elements 47, 48 and 51 lie substantially in a common plane and the stay extends diametrically across the lower hoop 48 and considerably below the bottom thereof.

A space or chamber 55, FIGURE 3, between the lower portion of pocket wall 28 and the upturned flap 29 constitutes a pocket to receive the lower hoop 48 and support the same under vertical compression. The two hoops are always under some vertical compression while in the pocket assembly. The compressed hoop will spread laterally to an elliptical shape while within the pocket assembly. The upper hoop 51 is arranged between the walls 28 and 23 and its top bears against the double thickness top wall of the pocket assembly formed by the elements 38 and 39. The upper hoop also assumes an elliptical shape under compression within the pocket assembly. In this connection, the two hoops always function in unison just as if they were a single hoop and when one is compressed vertically, the companion hoop will also be compressed. The pocket assembly is adequately wide, FIGURE 2, to allow for maximum lateral expansion of the hoops 48 and 51 under all extreme conditions of use. While the pocket assembly will normally be formed of non-stretch nylon or the like, it could be formed of material which can stretch laterally, although not vertically. The portion of the pocket assembly which receives the two hoops preferably should not be capable of stretching in the vertical direction.

The stay 47 enters downwardly between the wall 23 and intermediate wall 25 and is guided and confined laterally by a narrow guide pocket 33' formed by the elements 33 and 34. The vertical line of stitching 46 is approximately aligned with one edge of the guide pocket 33' and aids in guiding the stay 47 into the guide pocket. The stitching 46 also prevents the lower hoop 48 from falsely entering the space in front of the wall 25 which in intended for the stay 47 only. The guide pocket 33' remains open at its lower end, as stated, so that the stay may move freely vertically during bending movement by the wearer, as illustrate din action FIGURE 11 and 11a. The narrow guide pocket 33' will restrain the stay 47 from appreciable lateral movement and the thin stay will conform to the contours of the body yieldingly while constantly exerting a controlling or flattening pressure on the abdomen in concert with the two hoops 48 and 51, the latter also serving to hold the top edge of the girdle up at all times and to prevent rolling over or sagging thereof. An important feature of the invention is that the two compressed hoops 48 and 51 are always exerting tension at the bottom 56 of pocket part 55 and at the top double wall 38–39 thereof, thereby holding the top front of the girdle up.

The insert 50 enters and leaves the pocket assembly through the opening 49 and side portions of the hoops, FIGURES 2 and 4, are placed under the flap 36 so that it is virtually impossible for the insert to leave the pocket except when desired. The construction of the pocket assembly is fool-proof in that it prevents improper assembly of the insert into the pocket and renders it impossible for the insert to escape from the pocket except when desired.

When all other stitching operations are completed, and before the resilient insert 50 is assembled with the garment, ornamental lines of stitching 56 near the top of the garment are placed through all layers thereof in that region. These converging lines of stitching 56 serve to confine and center the upper hoop 51 of the insert, as shown clearly in FIGURES 1 and 2. Additional ornamental stitching 57 as desired may be placed through all thicknesses of the garment below the lower hoop 48 and this stitching confines and centers the lower hoop without restricting its lateral expansion when compressed vertically. The ornamental stitching 57 adds to the strength of the pocket assembly.

Figures 11, 11A:
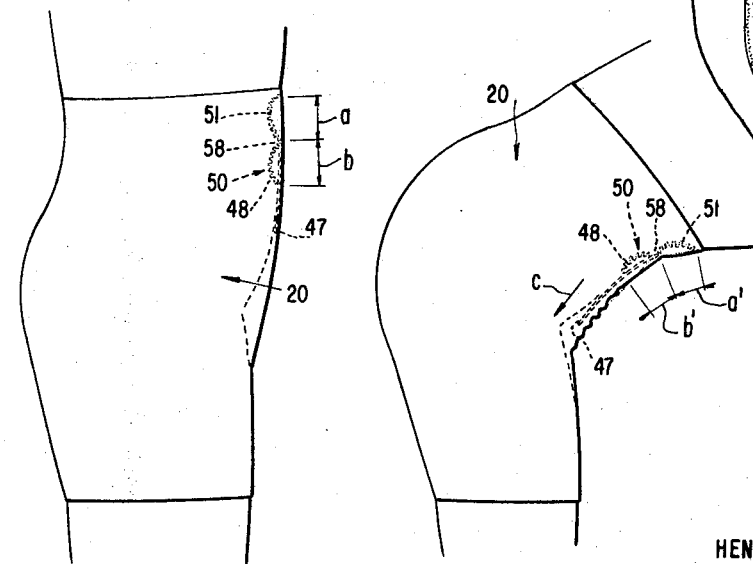
FIGURES 11 and 11a are action views of side elevation illustrating the movements of the control insert in the pocket assembly as the wearer bends.

FIGURES 5, 11 and 11a illustrate some of the movements of the invention elements during forward bending by the wearer of the girdle. FIGURE 5 shows that a hinge point 58 occurs between the hoops 48 and 51 where connected by the coupling 52. This is not a sharp or abrupt hinge point because the coupling 52 maintains an area of flatness and prevents digging into the body at this point. The stay 48 by a unique cantilever action tends to flatten the abdomen and urges the hoop 48 toward the abdomen and the two hoops and the stay function in unison in a very efficient manner to control the abdomen without restricting movements by the wearer and without discomfort. As explained, the hoops tend to hold up the top edge of the garment at all times and there are no abrupt parts to dig into the body.

FIGURE 11 shows the invention and relative position of parts when the wearer is upright. Even at this time, the hoops 48 and 51 are under some compression to hold the front of the garment up. The relative equal heights that the two hoops in FIGURE 11 assume are shown at a and b. FIGURE 11a shows the relative positions of the parts during bending. As shown, the bottom of the rib 47 leaves contact with the body and enters the space between the garment and body formed by bending. The top front of the garment is still held up by the action of the hoops which also control the abdomen supplemented by the cantilever action of the stay 47. There is now increased compression of the hoops as indicated at a' and b'.

A very important operational feature of the invention occurs at this time, FIGURE 11a, as shown graphically at c. This is the fact that the stay 47 slides downwardly a considerable distance through the narrow guide pocket 33' and in some instances well below the bottom open end of the guide pocket. This movement of the stay is unrestricted. This action prevents the top of the stay or the coupling 52 from jabbing into the abdomen at the bending point 58. If the stay 47 were confined at the bottom of the narrow pocket and could not reciprocate freely, movement would be severely restricted and considerable discomfort could occur during bending. If desired, FIGURE 2, the guide pocket 33' may be even shorter than shown so that its open bottom will terminate substantially at the bottom of the stay 47 when the wearer is upright. This would eliminate the possibility of wrinkles near the lower end of the guide pocket during bending restricting the free downward movement of the stay. The essence of the improved mode of operation inherent in the present invention resides in the describd freedom of movement of the stay 47 while the stay is positively connected with the two hoope 48 and 51 and having the lower hoop supported in the bottom of pocket 55 while the upper hoop exerts tension on the top of the pocket assembly, as described.

Figure 10:
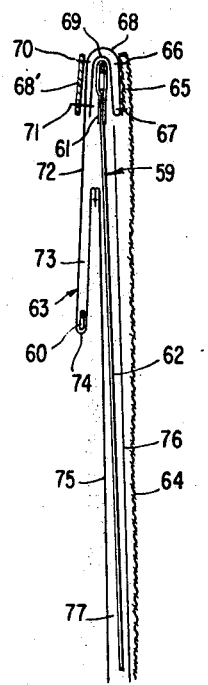
FIGURE 10 is a vertical section taken on line 10—10 of FIGURE 9.

FIGURES 9 and 10 show a modification wherein the girdle is of the shorter type and the waistline coincides with its top edge. In this type, the control insert 59 embodies only a single resilient wire hoop 60 connected by a coupling 61 to the top end of a resilient rib or stay 62. The construction of the girdle and particularly the construction of the pocket assembly 63 may in all other respects be substantially identical to the preceding embodiment. In effect, due to lowering of the top edge of the girdle, the upper control hoop of the prior form has been eliminated and the pocket assembly is shortened correspondingly from its top. It may also be noted in FIGURE 9 that the lower open end of narrow guide pocket 77 terminates very near the lower end of stay 62 so that during bending possible wrinkles in the pocket assembly will not restrict the movement of the stay, as previously discussed.

Briefly, in FIGURES 9 and 10, the front wall of the girdle is shown at 64 and may be formed of non-stretch or stretch fabric and is folded inwardly at its top to form a flange 65, stitched at 66 and 67 to the outer layer 68 of a double-walled fold having an inner layer 69, exactly described in connection with FIGURE 3. The interior finishing band 68' is stitched at 70 to the element 68 at the top of the garment and another line of stitching 71 connects the band 68' with the interior layer 69 and the wall 72 of the pocket 73 which receives the hoop 60, FIGURE 10. The bottom of the hoop 60 is supported by the bottom 74 of the pocket and the hoop is compressed vertically and spreads laterally and upholds the top edge of the garment. Stay 62 enters between the pocket walls 75 and 76 and passes through the narrow vertical guide pocket 77 open at its bottom. The pocket assembly 63 has a side opening 78 corresponding to the side opening 49 through which the insert 59 may enter and leave the pocket assembly. It is believed that no further description of the operation is required in connection with FIGURES 9 and 10 in view of the detailed description of the prior embodiment and since the basic mode of operation remains unchanged.

Figure 12:
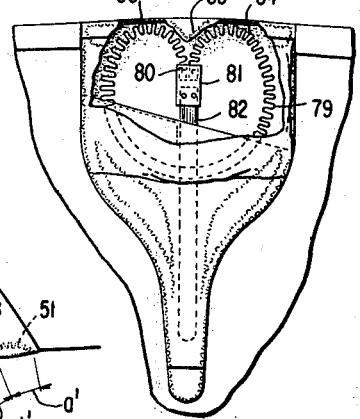
FIGURE 12 is an interior side elevation, similar to FIGURE 9, showing a further modification.

FIGURE 12 shows a further modification similar to the construction in FIGURES 9 and 10 and designed for use in waist length girdles where there is less bending. Instead of the essentially circular hoop 60, a single heart-shaped wire hoop 79 is employed, the downwardly directed top point 80 of which is connected by a coupling element 81 with a stay 82 which may be identical in construction and action to the previously-described stays 47 and 62. The pocket construction is not shown in FIGURE 12 because it is essentially identical to the previously-described constructions. The advantage of the heart-shaped hoop resides in the provision of two spaced bearing points 83 and 84 at the top of the hoop which engage within the top double thickness wall of the garment to uphold the same. The bottom of the hoop 79 is supported in the bottom of a pocket which will not stretch vertically as shown at 74, FIGURES 9 and 10 In all other respects, the construction and mode of operation of the invention is essentially the same as in FIGURES 9 and 10. The heart-shaped hoop 79 may be centered in the pocket assembly at the top by a substantially V-shaped line of zigzag stitching 85 in lieu of the previously-described ornamental stitching 56. The heart-shaped element, FIGURE 12, does require some pre-shaping.

The remaining drawing FIGURES 13 through 21 are concerned with a more simplified pocket assembly for the metallic abdominal control insert, said pocket assembly being formed essentially from a fabric blank 86 as depicted in FIGURE 15. As will be explained, this one piece blank cooperates with the girdle front wall 87 in a series of simplified assembly operations, FIGURES 16a through 16d, to make the pocket assembly. This replaces the assembly shown at FIGURE 7, for example, consisting of several separate wall portions mounted upon the front wall 22 of the girdle.

In FIGURE 15, the blank 86 includes a generally rectangular portion 88 having imaginary folding lines 89 and being formed of material which is non-elastic at least in the up-and-down direction. The blank includes a bottom reduced width portion 90 which will eventually form one wall of a guide passage for a movable rib or stay and an intermediate contoured portion 91 having imaginary folding lines 92. If desired, the entire blank 86 may be of non-stretch material but, optionally, the portion 90 up to the lower folding line 92 could be stretch material, either one-way or two-way stretch. The portion 88 preferably will be non-stretch in the up-and-down direction from the top to the uppermost folding line 92.

FIGURES 16a to 16d show the essential steps of constructing the simiplified pocket assembly. Initially, in FIGURE 16a, the blank 86 is laid upon the garment front wall 87 with the top edge 86' of the blank extending beyond the upper edge 87' of the girdle. First and second lines of stitching 93 and 94 are now formed through the superposed parts as shown in FIGURE 16a. In FIGURE 16b, the girdle wall 87 is folded away from the blank 86 to form an interior flange 95 and the projecting portion of the blank is folded back onto the blank and over the flange 95 and a third line of stitching 96 is applied through the two folded layers of the blank only and not through the flange 95 or wall 87.

Following this, FIGURE 16c, the blank is folded back over on top of the wall 87 or onto the inside of the girdle, the original lines of stitching 93 and 94 being hidden from view in FIGURE 16c but the line of stitching 96 being shown. Utilizing the folding lines 92, the blank is pleated as at 97 and additional L-shaped lines of stitching 98 are formed through the blank and the wall 87 but not through the pleat 97 as depicted in FIGURE 16c. Following this, FIGURE 16d, side lines of stitching 99 are formed through the reduced width portion 90 and the girdle wall 87 to produce the narrow guide pocket which is open at its lower end. The lines of stitching 99 follow the curved contour of the pocket assembly and secure down the sides of the double thickness pleat 97, as indicated at 99'. Finally, lines of stitching 100 and 101 are formed through all thicknesses of material at the top of the pocket assembly and girdle to complete the formation of the pocket assembly and the attachment thereto to the girdle wall 87.

It may now be seen in FIGURE 16d that the sides of the pocket are open as at 102 to receive the abdominal control insert such as the one shown in FIGURE 13. Optionally, one side of the pocket may be closed by extending one line of stitching 99 all the way to the top edge of the girdle, such as the left-hand edge in FIGURE 16d. The contoured stitching 100–101 is designed to center and position a heart-shaped wire element such as the element 103 in FIGURE 13. As shown, optionally, FIGURES 13 and 17, instead of the stitching 100–101, a pair of snap fasteners consisting of male elements 104 and female elements 105 may be applied while the parts are arranged in their relative positions shown in FIGURE 17. In general, this corresponds to the arrangement of parts shown in FIGURE 16b except that the wall 87 is disposed vertically in FIGURE 17 so that the elements 104 will not be attached thereto. As shown in FIGURE 13, the two snap fastener assemblies engage in the two upper loop portions of the heart-shaped element 103 and thus serve to center the same in the pocket assembly. Where a circular wire element is employed instead of the heart-shaped element 103, as may be the case in the majority of instances, a single snap fastener may be employed at the transverse center of the pocket assembly, near the top thereof, to center the wire element instead of the pair of snap fasteners shown. Additionally, in lieu of snap fasteners where a circular element is employed, the stitching at the top of the pocket assembly may correspond to that shown at 56 in the prior embodiment, FIGURES 1 and 2.

Continuing to refer to FIGURE 13 and also to FIGURES 14 and 18 showing the construction produced in accordance with FIGURES 15 through 17, it may be noted that the final folding of the top of the pocket assembly in FIGURE 16c produces a wall of two thicknesses 106 and 107 at the top of the pocket to absorb the wear from the element 103. The metal rib or stay 108 is shown in FIGURE 13 connected with the heart-shaped element 103 and projecting through the narrow guide pocket formed by the lines of stitching 99 with the reduced width portion 90 and the girdle wall 87. The bottom of the narrow guide pocket is open and terminates substantially at the bottom of the stay 108 so that wrinkling will not interfere with free downward movement of the stay, as previously discussed. The general mode of operation remains unchanged in this form of the invention and need not be repeated in detail. The bottom of the pocket which supports the wire element 103 is formed by the pleat 97. FIGURE 14 in a somewhat schematic manner shows the formation of the simplified one-piece pocket assembly described in connection with FIGURES 13 and 15 through 17. FIGURE 18 shows in more complete detail the construction of the upper edge of the garment and the top of the simplified pocket assembly.

It should again be emphasized that a circular wire control element or hoop like the hoop 60 of FIGURE 9 may be used instead of the heart-shaped element 103. As explained, this can be done by simply modifying the stitching at the top of the pocket to produce stitching as shown at 56 in FIGURE 1 or by using a single snap fastener instead of a pair. In all other respects, the simplified pocket assembly made from the blank 86 possesses the advantages and features previously-described in the application.

FIGURES 19 through 21 show another slight modification wherein the pocket assembly is constructed generally in accordance with FIGURES 13 through 18. However, in FIGURES 19 through 21, the double thickness top wall of the pocket is produced in a different manner by means of a patch or lining and without the particular folding of parts shown in FIGURE 18.

In FIGURE 19, a pocket blank 109 is shown having an upper portion 110 with folding line 111. A lower reduced width extension 112 is included on the blank, together with a waist portion 113 and folding lines 114 and 115. FIGURE 20a shows the girdle front wall 116 upon which is placed the blank 109 and a first line of stitching 117 is applied through the two parts. In FIGURE 20b, a rectangular reinforcing patch 118 of any preferred material is placed upon the edge portion of the blank 109 and lines of stitching 119 and 120 are applied through the parts. The first line of stitching 117 is hidden in FIGURE 20b.

FIGURE 21 shows the top of the pocket assembly and girdle in cross section after folding generally as in the prior embodiment. The folded patch 118 is shown forming the inner layer of the double thickness pocket top wall. The bottom of the pocket can similarly be reinforced by the use of an additional patch 121 shown applied to the blank in FIGURE 19. The mode of operation remains unchanged in connection with FIGURES 19 through 21.

As shown in FIGURES 22 to 24, the invention in another form is also applicable to corselets or the like. Applied to a corselet indicated by the numeral 122, the invention aids materially in holding up the front top edge of the garment and also helps to hold the top edge against the body at the center of the chest, eliminating unsightly gapping at this point. As in all prior forms of the invention, abdominal contrrol is provided without restricting movement or sacrificing comfort.

Referring to the drawings, a pocket assembly 123 is applied to the interior of the garment front wall 127 centrally thereof to receive a figure-8 assemblage of upper and lower zigzag wire hoops 124 and 125 connected tangentially by a coupling element 126. This assemblage or control insert is comparable to the insert 50 of FIGURE 1 although with some modification, to be described. The waist line and normal bending line of the corselet 122 is at the elevation of the element 126 and approximately at the vertical center of pocket assembly 123. Generally as described in connection with FIGURES 13 to 21, the pocket assembly utilizes the garment front wall 127 and a single interior section of fabric or wall 128, which is preferably non-stretch at least in the up and down direction. As previously described, in the other embodiments, the hoops 124 and 125, when assembled in the garment, are always under some compression in the up and down direction and react against the top and bottom extremities of the pocket, as shown in FIGURE 23, tending to hold taut the adjacent area of the garment front wall.

The control insert includes a downwardly extending rib 129 secured to the coupling element 126 and extending across and below the lower hoop 125 and below the pocket assembly 123. As in all forms of the invention, the control rib lies on the outer side, or the forward side, of the lower hoop 125 and the pocket constructions throughout the application serve the important purpose of making it impossible to misplace the rib in the assembly. That is to say, in FIGURES 23, 10 and 3, the control insert could not be accidentally reversed so that the rib would lie on the rear side of the lower hoop, and if this were attempted, the rib could not enter its long narrow guide pocket while the adjacent hoop entered the bottom of the main pocket structure. This is an important safeguard and assures the unique operation of the invention.

The rib 129 of the present embodiment and the corresponding rib in each prior embodiment should be considerably more rigid than conventional ribs employed in the prior art for broadly similar purposes. Since the control rib in all forms of the invention is free to move downwardly during bending movements by the wearer, it may be quite stiff without causing discomfort or restricting movement. A further refinement, not shown in the drawings which preferably should be employed on the main control rib, is a slight inward bending or curving of its lower tip. Such bending or curving, when considered in connection with FIGURES 11 and 11a, has the effect of concealing the lower end of the rib as it would be viewed through the front wall of the garment when the wearer is upright, FIGURE 11. Since this bending or curving is slight, it will not cause jabbing of the lower end of the rib into the body during bending as illustrated in FIGURE 11a. The feature is optional to the invention but is preferred to be used.

In all forms of the invention, the rib exercises control over the wire hoop or hoops connected with it and the degree of control is greater with the dual or figure-8 arrangement of hoops. In any event, this controlling action of the rib on the hoops particularly during forward bending by the wearer prevents digging in to the body at the bending point which is the location of the element 52 in FIGURE 1 and the corresponding element 126 in FIGURE 22. Action views, FIGURES 11 and 11a, illustrate how the rib exercises control over the figure-8 arrangement of hoops and improves their action and causes them to perform in a different manner than would be possible if they were not connected to the rib. When the wearer is upright, FIGURE 11, the two hoops are under some vertical compression in the pocket structure as is also true in FIGURE 22. The top edge of the garment is being held up and the rib is not under bending stress but nevertheless is held snugly between the abdomen and the front wall of the garment and acts with the hoops to flatten the abdomen. When bending occurs, as in FIGURE 11, the point of maximum bending is where the two hoops are connected, as previously explained. If the controlling rib were not present, the two hoops could hinge or bend more abruptly and the bending point 58 could very well dig into the abdomen. However, in FIGURE 11a, the cantilever action or resistance to bending by the rib 47 held between the body and the garment and lying forwardly of the lower loop of the pair as discussed, somewhat counteracts the hinging or bending at the point 58 and holds this point 58 outwardly relative to the abdomen so that digging in cannot occur. The condition is also shown in FIGURE 5. Stated somewhat differently, the rib during bending movement exercises a restraining force on the element 58 which might ordinarily tend to dig in as the two hoops become angled forwardly more abruptly. All the while, the compressive stress on the hoops in the pocket allows them to tension the top edge of the garment and the rib itself cannot dig into the body because the downward force transmitted to the rib is relieved by the rib's ability to slide freely down into the narrow guide pocket.

Returning to FIGURES 22 through 25, a narrow guide pocket 130 in the form of a fabric tube which preferably can stretch vertically extends below the bottom of pocket assembly 123 and receives the rib 129 to guide the same and allow it to move downwardly during bending movements. This guide tube 130 is stitched for a short distance only at 131 to the front wall 127 below the main pocket assembly 123 and is again stitched for a short distance at 132 to the garment front wall near the bottom edge of the garment. The intervening major portion 133 of the fabric guide tube remains unstitched or free from attachment to the garment front wall so that the normal wrinkling of the front wall at the time of bending will not directly act upon the tube. To further achieve this result, the unattached portion 133 of the fabric tube receives a very thin flexible reinforcing rib 141 which may be of the same width as the main rib 129, FIGURE 22. However, the rib 141 is only about two inches in length and extends from a point just above the lower tip of the rib 129 downwardly approximately one-half the distance to the short lines of stitching 132. The rib 141 serves to guide the main rib 129 in its downward movement to a point below that region where the garment folds or wrinkles. Additionally, the small rib 141 protects the body against possible jabbing by the main rib 129 in this region.

In order to fixedly secure the small rib 141 to the front side of the tube 130 and ahead of the main rib 129, FIGURE 24, a patch or strip of fabric 142 is stitched to the front wall of the tube to enclose the small rib. This is done while the tube material is flat and before the final formation of the tube 130. The side lines of stitching which secure the patch 142 are indicated at 143. Transverse lines of stitching 144 are formed across the ends of the patch 142 to fully enclose the small rib 141 and prevent the same from moving lengthwise of the tube structure. While shown mounted on the front side of fabric tube 130 in FIGURES 23 and 24, the small rib may also be mounted on the rear or inner side of this tube so as to lie between the main rib 129 and the body of the wearer. This arrangement is preferable.

The described construction of the tube 130 allows free and unobstructed downward movement of the main control rib 129 during bending. The fabric tube 130 may be closed off at its lower end by stitching, if desired, since it is considerably longer than the rib 129 and the closing can never restrict the required downward movement of the rib. In general, the two hoops 124 and 125 and the rib 129 coact in the main pocket structure to control the abdomen on the corselet in the same manner previously described for other embodiments.

Additionally, there is provided on the corselet an upwardly extending vertical rib 134 coupled at 135 to the upper hoop 124 at the top of the latter and extending above the main pocket assembly 123 to the top edge of the garment front wall at the center thereof. The rib 134 is preferably narrower than the rib 129 as shown. The rib 134 is held beneath a cloth strip 136 attached to the inner surface of the front wall 127 by lines of stitching 136', thus producing a norrow pocket for the rib 134. This pocket is closed at its upper end 137 by a double thickness wall structure similar to that described in connection with FIGURES 9 and 10. The rib 134 is always urged upwardly by the tension of the two hoops and serves to hold up the top of the corselet and also to hold the garment against the body in the middle of the chest so as to prevent unsightly gapping of the garment away from the body at the top center of the front wall. Conventional side ribs 138 on the corselet assist in holding up the top of the strapless garment.

As shown in FIGURE 22, a laterally off-center slit 139 is formed through the interior pocket wall 128 for about two-thirds of the vertical length of the pocket measured from the top down. The metal control insert embodying the connected elements 124, 125, 129 and 134 is placed in the pocket and removed therefrom through this slit. The provision of the slit eliminates the need for a mechanical closure means.

Alternatively, in FIGURE 26, the interior wall 128 may be entirely closed and instead of the described slit 139, a vertical zipper closure 140 is placed on the garment front wall 127 extending from a point adjacent the bottom of the main pocket assembly 123 to the top of the garment. This zipper will render it easy to remove or replace the metal control insert and the fabric of the pocket assembly will tend to protect the body of the wearer from contact with the zipper parts. Suitable padding can also be stitched to the interior side of the pocket structure at points where the metal parts of the zipper might irritate the flesh, such as at the coupling element 126 or at the top end of the upper rib 134.

FIGURES 27 to 28b show a modification applicable to the girdle or corselet forms wherein the main pocket 145 has a vertically extending slit 146 at the tarnsverse center thereof. The resilient control insert 147 shown diagrammatically in FIGURE 27 is introduced into the pocket and removed therefrom through the slit 146. The usual coupling element 148 of the control insert is located near the center of the slit. To preclude the possibility of the metal insert coming into contact with the flesh to create an uncomfortable situation, a suitable padding section 149 of substantial thickness is provided. One side portion of the pad 149 is stitched at 150 to the interior of the main pocket 145 and thus permanently attached thereto. The other portion or half 151 of the pad forms a free flap which may project outside of the main pocket, FIGURES 27 and 28a, until the control insert is assembled in the pocket. After this is done, FIGURE 28b, the flap 151 is simply tucked into the main pocket through the slit 146 so that the pad 149 now lies wholly within the pocket between the insert 147 and the slit 146. For security, the pad and main pocket may be equipped with snap fastener elements 152 and 153 to secure the pad in the interior position. This is an optional feature which can be omitted in some cases. With the pad 149 fully inserted in the main pocket between the slit 146 and the metal insert, there is no possibility of the insert contacting the flesh of the wearer or becoming accidentally dislodged from the pocket. The size and thickness of the pad and its shape are subject to considerable variation.

FIGURES 29 and 30 are exaggerated diagrams showing how the basic or main control rib R utilized throughout all forms of the invention functions to control and flatten the stomach bulge B without digging into the body at either end of the rib. FIGURE 29 shows the stomach bulge without any control and with the rib R lying substantially tangent to the curvature of the stomach bulge. FIGURE 30 depicts the condition where pressure, as indicated by the arrows, is applied to the rib R by the tension of the garment wall. The point of greatest pressure will occur near the longitudinal center of the rib R. FIGURE 30 depicts how the stiff control rib will effectively flatten the stomach bulge without having its ends dig into the body. While the showing is somewhat exaggerated, and in practice the prounced spacing between the top and bottom ends of the rib and the body may not be present, nevertheless these two figures do illustrate the principle under lying this very substantial component of the invention which does have the ability to flatten the body without digging in.

I claim:

1. In a garment, a body portion having a front wall, an abdominal control unit on the fornt wall including at least a single resilient hoop and a control rib secured to the top of the hoop and extending across the hoop in an up and down direction and somewhat below the bottom of the hoop, and means securing said unit to said front wall in such a manner that said rib is disposed for free movement downwardly relative to the front wall and said hoop when compressed in the up and down direction is capable of lateral expansion.

2. In a garment as defined by claim 1, and wherein said means engages said hoop to prevent appreciable displacement thereof in the up and down direction and said means includes a relatively narrow guide passage for the rib in the up and down direction, whereby the rib during up and down movement is prevented from moving laterally appreciably.

3. In a garment as defined by claim 1, and wherein said means comprises a pocket structure on said front wall receiving said unit and having a guide passage extension for said rib in the up and down direction and also having opening means through which the unit is applied to and removed from the garment.

4. In a garment as defined by claim 1, said means including parts engaged by the top and bottom of the resilient hoop and constantly maintaining the hoop under some degree of compression in the up and down direction causing the hoop to assume a somewhat elliptical configuration with the major ellipse axis extending circumferentially of the body.

5. In a garment as defined by claim 1, and wherein said hoop is substantially circular while in a relaxed condition and of a size sufficient to span a substantial portion of the abdomen of the wearer of the garment.

6. In a garment as defined by claim 5, and wherein said hoop is formed from a section of highly resilient wire, said wire section having a zigzag configuration around the circumference of the hoop and said zigzag formations lying substantially in a common plane so that the hoop is capable of lying flat against the abdomen.

7. In a garment as defined by claim 1, and said unit comprises a substantially flattened coupling element firmly securing the top end of the rib to the top of the hoop.

8. In a garment as defined by claim 7, and wherein said hoop is substantially heart-shaped and said coupling element connects the top end of the rib with the extremities of the hoop which form the lobes of the heart, said lobes being at the upper side of the hoop.

9. In a garment as defined by claim 1, and wherein said unit comprises a pair of resilient hoops together constituting substantially a figure-8 formation, and means coupling the top of one hoop to the bottom of the other hoop generally tangentially and also coupling said hoops to the top of said rib, said figure-8 formation extending in the up and down direction at the abdominal area of the garment.

10. In a garment as defined by claim 9, wherein said garment is a girdle and the top hoop of said pair is positioned at the top edge and front of the girdle and is tensioned to hold up said top edge and prevent the same from sagging or rolling over.

11. In a garment as defined by claim 9, and wherein said coupling means also constitutes a hinging point between said hoops and between the upper hoop of the pair and the top of said rib during bending movements by the wearer of the garment.

12. In a garment as defined by claim 9, and wherein the garment is a corselet, and a second rib secured to the top of the uppermost hoop of the figure-8 formation and extending thereabove in the up and down direction to approximately the top edge of the corselet at the center thereof and holding the top edge up and against the body at the center of the chest.

13. In a garment as defined by claim 12, and an element serving to position the second rib on the front wall of the corselet, said element being a part of said means securing the unit to said front wall.

14. In a garment as defined by claim 12, wherein the second rib is narrower than the first-named rib and less stiff than the first-named rib, the first-named rib being relatively stiff so as to be capable of exerting a substantial flattening force against the abdomen without digging into the body of the wearer at either end of the first-named rib.

15. In a garment, a body portion including a front wall, a pocket means formed on the interior of the front wall and covering a substantial part of the abdominal region, said pocket means having an access opening and a restricted guide passage extending in the up and down direction and leading from the pocket means, and an abdominal control unit mounted removably in the pocket means including at least a resilient hoop and a control rib secured to the top of the hoop and extending across the hoop and below the hoop in the up and down direction, said control rib entering the restricted guide passage and being free to move downwardly therein and said hoop being tensioned in the up and down direction within the pocket means and bearing against top and bottom parts of the pocket means and being free to expand laterally into an elliptical shape within the pocket means.

16. In a garment as defined by claim 15, and wherein said control unit includes a pair of resilient hoops within the pocket means constituting substantially a figure-8 in the up and down direction, the top of the lower hoop and the bottom of the upper hoop coupled to the top of the control rib and both of said hoops being somewhat compressed in the up and down direction.

17. In a garment as defined by claim 15, and wherein said restricted guide passage for said rib comprises a flexible tube extension on the pocket means connected with said front wall for short distances only near the bottom of the pocket means and the bottom edge of the garment, the intervening section of the tube extension being unattached to said front wall so as to be uneffected by the horizontal tensions and wrinkling of the front wall.

18. In a garment as defined by claim 17, and an additional short rib attached to the unattached section of the tube extension in partially overlapping relation with the bottom of the control rib and helping to guide the control rib within the tube extension.

19. In a garment as defined by claim 16, and wherein the garment is a corselet, and a second rib connected with the top of the upper hoop of said pair and extending above the top of the pocket means in the up and down direction substantially to the top edge of the corselet and holding up said top edge and preventing the same from gapping away from the body.

20. In a garment as defined by claim 19, and a strip of fabric on the interior of said front wall substantially covering and enclosing said second rib.

21. In a garment as defined by claim 1, and wherein said means comprises a pocket assembly on the interior of said front wall, said pocket assembly including a forward pocket wall immediately inwardly of said front wall, a foreshortened intermediate wall, and an interior pocket wall having a lower upturned flap connected to the top of the intermediate wall, depending extensions on the forward and intermediate pocket walls connected to form a guide pocket extension for said control rib, and stitching means interconnecting marginal portions of said pocket walls, flap and said front wall of the garment body portion.

22. In a garment as defined by claim 21, and a substantially vertical line of stitching connecting the pocket forward wall and foreshortened intermediate wall and serving to guide the rib into the guide pocket extension and preventing said hoop from entering the space between the pocket forward wall and intermediate wall, whereby the hoop is always guided properly into the lower pocket portion formed by the interior pocket wall and said flap.

23. In a garment, a front wall portion having an upper edge, a unitary section of sheet material mounted on the interior of said front wall portion and secured thereto and forming therewith a pocket, the pocket having a top closed end adjacent said upper edge of the garment and a lower closed end substantially below the upper edge and a narrow extension below the lower closed end, and an abdominal control insert within the pocket, said insert including a resilient hoop having its top and bottom engaging said top and lower closed ends of the pocket and an elongated resilient control rib secured to the top of the hoop and crossing the hoop and extending below the bottom of the hoop in an up and down direction, said rib extending into the narrow extension of the pocket and being able to move upwardly and downwardly freely therein during all bending movements by the wearer of the garment.

24. In a garment as defined by claim 23, and wherein said lower closed end of the pocket is formed by a folded pleat in the unitary section of sheet material and the top closed end is formed by folding over an end portion of the unitary section and connecting such portion with said front wall near the top edge thereof.

25. In a garment as defined by claim 23, and reinforcing patch elements on the unitary section of sheet material producing areas of double thickness thereon which constitute said top and lower closed ends of the pocket.

26. In a garment as defined by claim 3, and wherein said pocket structure includes additional means to maintain the hoop centered in the pocket structure so that the control unit will not move appreciably to either side of a vertical center line of the front wall and pocket structure.

27. In a garment as defined by claim 21, and wherein the pocket assembly has an opening leading into one side thereof through which the control unit may be introduced into the pocket assembly and removed therefrom.

28. In a garment as defined by claim 27, and a flap on the pocket assembly adjacent the side opening and engageable over said hoop and preventing accidental separation of the control unit from the pocket assembly.

References Cited

UNITED STATES PATENTS 2,774,073   12/1956   Herbener _____ 128—569 XR
3,295,531   1/1967   Herbener _____ 128—533

L. W. TRAPP, Primary Examiner

U.S. Cl. X.R.

128—538, 570